(12) United States Patent
Papaefstathiou et al.

(10) Patent No.: US 7,571,088 B2
(45) Date of Patent: Aug. 4, 2009

(54) SIMULATION OF CONNECTED DEVICES

(75) Inventors: Efstathios Papaefstathiou, Redmond, WA (US); Glenn R. Peterson, Kenmore, WA (US); John M. Oslake, Seattle, WA (US); Pavel A. Dournov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 11/394,483

(22) Filed: Mar. 31, 2006

(65) Prior Publication Data

US 2007/0233450 A1 Oct. 4, 2007

(51) Int. Cl.
*G06F 17/50* (2006.01)
*G06F 13/10703* (2006.01)
(52) U.S. Cl. .................... 703/16; 703/21; 717/124
(58) Field of Classification Search .......... 703/14, 703/21, 22, 16; 717/124
See application file for complete search history.

(56) References Cited

U.S. PATENT DOCUMENTS

2006/0198318 A1* 9/2006 Schondelmayer et al. ... 370/252
2006/0235675 A1* 10/2006 Oslake et al. ................ 703/21
2006/0248510 A1* 11/2006 Dournov et al. ............. 717/124
2007/0162268 A1* 7/2007 Kota et al. ................... 703/14

OTHER PUBLICATIONS

U.S. Appl. No. 11/401,077, filed Apr. 10, 2006, Papaefstathiou, et al.
U.S. Appl. No. 11/394,473, filed Mar. 31, 2006, Peterson, et al.
U.S. Appl. No. 11/394,474, filed Mar. 31, 2006, Papaefstathiou, et al.
U.S. Appl. No. 11/394,945, filed Mar. 31, 2006, Papaefstathiou, et al.
U.S. Appl. No. 11/105,251, filed Apr. 13, 2005, Dournov, et al.

* cited by examiner

*Primary Examiner*—Thai Phan
(74) *Attorney, Agent, or Firm*—Workman Nydegger

(57) ABSTRACT

Simulating device interactions. A method may be practiced in a computing system for simulating interconnected devices. The method of simulating device interactions may be done in performing an overall transaction to obtain an output of system performance characteristics including measurement of latencies and/or device loads for actions performed by devices in performing the overall transaction. The method includes dividing a transaction into individual actions. The actions are applied to appropriate device models to produce latencies and/or device utilizations for the action as applied to the appropriate device model. This may be done by including an indication of an action type and optionally an action subservice. Memory resources may be conserved by ending the simulation when latencies and/or device utilizations have settled. Device utilization and latency may be aggregated and averaged over time. When changes in the latencies and/or device utilizations are within a predetermined range, the simulation can be ended.

18 Claims, 3 Drawing Sheets

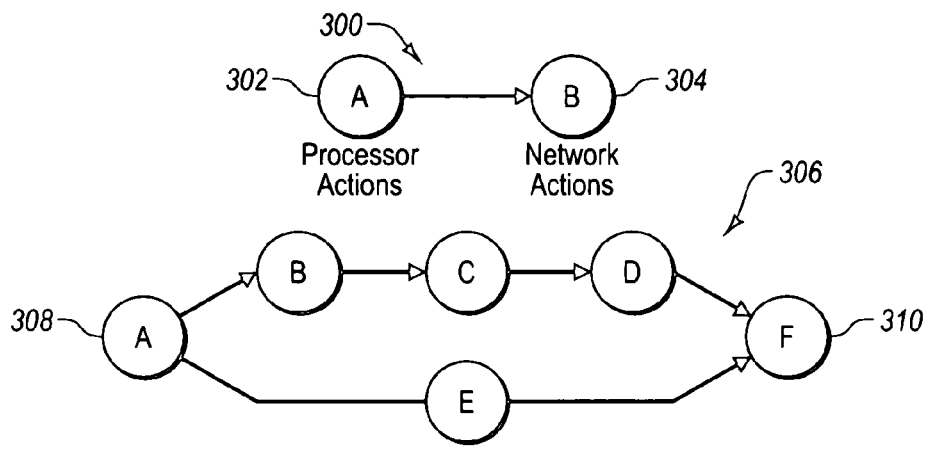
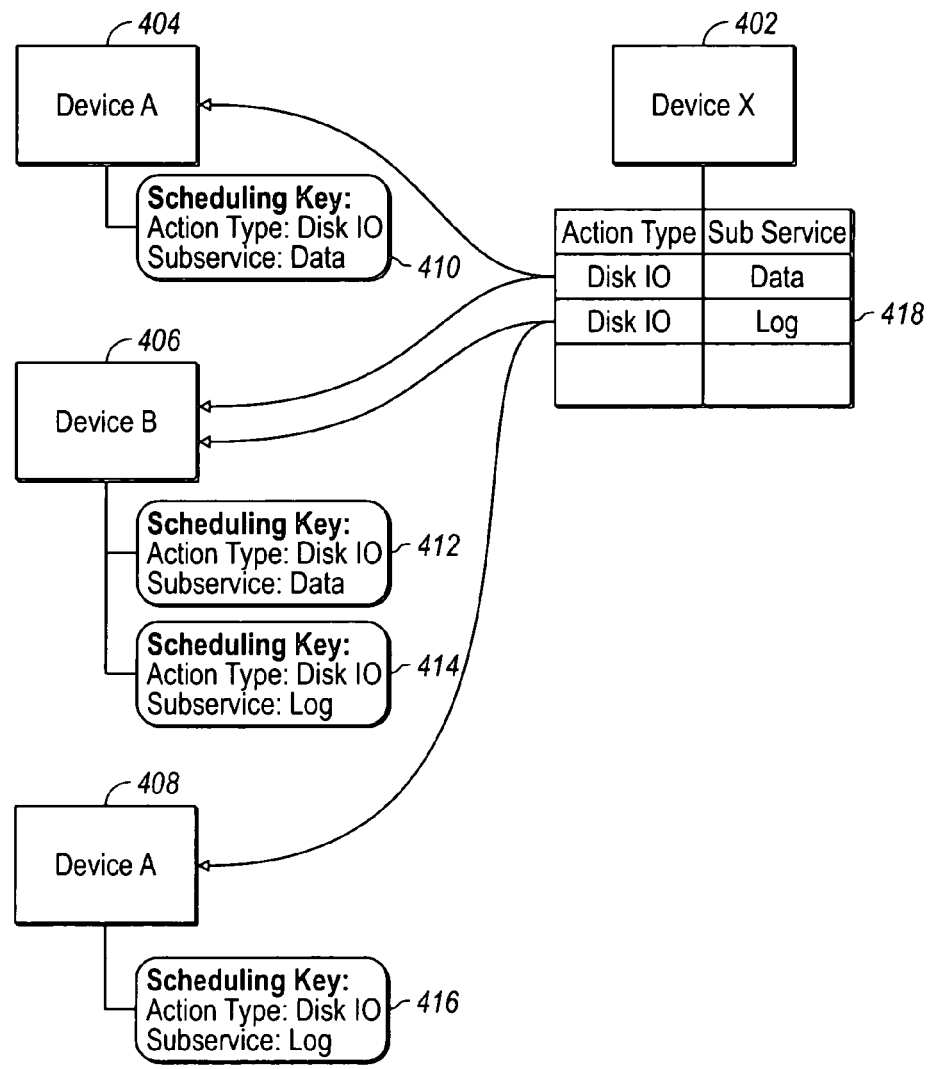
Fig. 3
Fig. 4

SIMULATION OF CONNECTED DEVICES

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computer systems can be interconnected in large network configurations so as to provide additional functionality. For example, one typical network configuration is a configuration of computer systems interconnected to perform e-mail functionality. In one particular example, an e-mail server acts as a central location where users can send and retrieve emails. For example, a user may send an e-mail to the e-mail server with instructions to the e-mail server to deliver the message to another user connected to another e-mail server. Users can also connect to the e-mail server to retrieve messages that have been sent to them. Many e-mail servers are integrated into larger frameworks to provide functionality for performing scheduling, notes, tasks, and other activities.

Each of the computer systems within a network environment has certain hardware limitations. For example, network cards that are used to communicate between computer systems have a limited amount of bandwidth meaning that communications can only take place at or below a predetermined threshold rate. Computer processors can only process a given amount of instructions in a given time period. Hard disk drives are limited in the amount of data that can be stored on the disk drive as well as limited in the speed at which the hard disk drives can store the data.

When creating a network that includes a number of different computer systems it may be desirable to evaluate the selected computer systems before they are actually deployed in the network environment. By evaluating the systems prior to actually implementing them in the network environment, trouble spots can be identified and corrected. This can result in a substantial cost savings as systems that unduly impede performance can be upgraded or can be excluded from a network configuration.

Evaluation systems have previously been implemented to evaluate the performance of selected computer systems prior to the deployment of such systems. In previous evaluation systems, the amount of memory required to perform the evaluation was often unknown. In particular, in previous systems, the systems would simulate for a selected period of time. The amount of memory used in the simulating system was dependent on the amount of time the simulation took and the various activities that took place within the simulation. Because previous systems maintained output data points for all simulation results data, memory requirements for the simulating system were typically high and expanding as more data points were generated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment included herein includes a method of simulating device interactions. The method may be practiced, for example, in a computing system for simulating interconnected devices. The method of simulating device interactions may be done in performing an overall transaction to obtain an output of system performance characteristics including measurement of latencies and/or device loads for actions performed by devices in performing the overall transaction. The method includes dividing a transaction into individual actions. The actions are applied to appropriate device models to produce latencies and/or device utilizations for the action as applied to the appropriate device model. This may be done by including an indication of an action type and optionally an action subservice.

Another method disclosed herein may be practiced in a computing system for simulating interconnected devices. The method is a method of simulating device interactions in performing an overall transaction to obtain an output of system performance characteristics including measurement of latencies and/or device loads for actions performed by devices in performing the overall transaction. The method includes producing latencies and/or device utilizations for one or more transaction by simulating actions of the transactions applied to the appropriate device models. One or more averaged transaction latencies and/or device Et utilizations are stored over time for the one or more transactions. One or more current transaction latencies and/or device utilizations are aggregated into the one or more stored averaged transaction latencies and/or device utilizations. If the statistical characteristics of the averaged transaction latencies and/or utilizations are within a predetermined range of statistics quality, simulating device interactions is ended.

Another embodiment includes a computer readable medium for use in a computing system for simulating interconnected devices. The computer readable medium includes data structures for defining devices useful for simulating device interactions in performing an overall transaction to obtain an output of system performance characteristics including measurement of latencies and/or device loads for actions performed by devices in performing the overall transaction. The computer readable medium includes a first field defining an action type for an action. The computer readable medium optionally includes a second field related to the first field defining a subservice defining a particular class of the action type. One or more device model fields are included on the computer readable medium defining device models that contain methods for calculating the latencies and/or device utilization for actions simulated by the device models. The computer readable medium further includes a third field comprising a scheduling key correlating a device model to an action type and optionally a subservice.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates edge labeled action graphs;

FIG. 4 illustrates subservice mapping;

DETAILED DESCRIPTION

Figure 1:
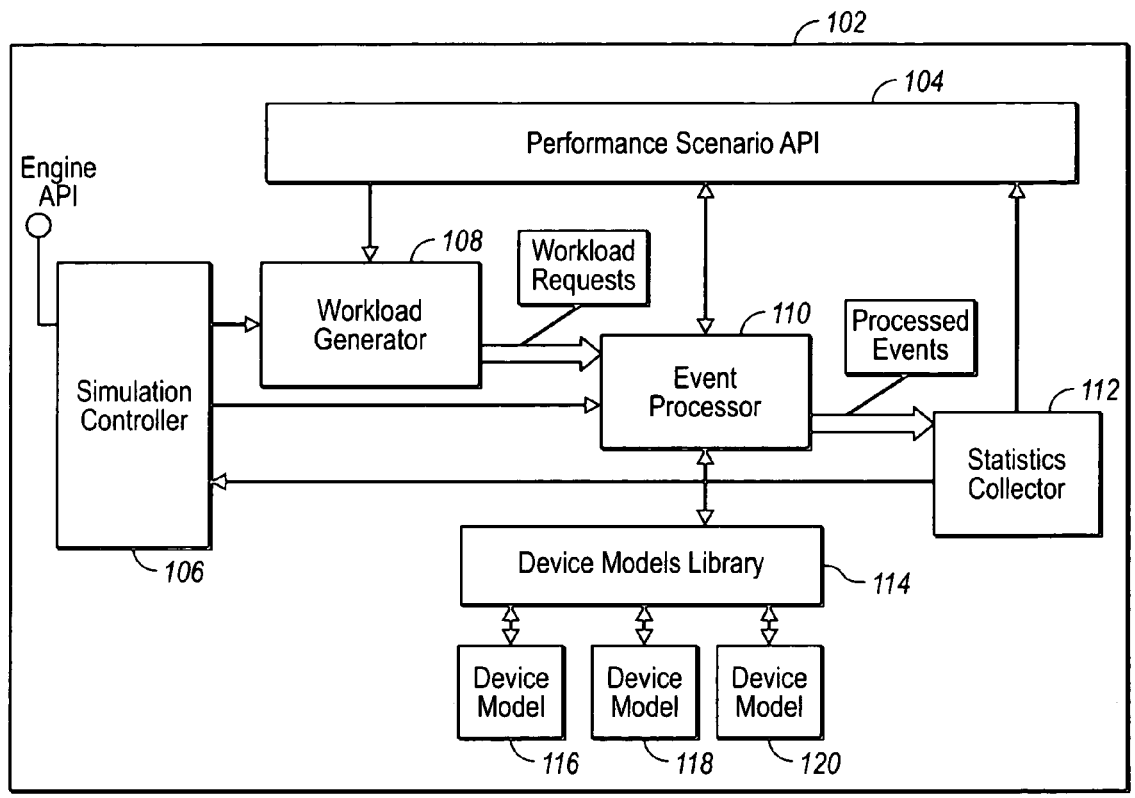
FIG. 1 illustrates an overall model.

Embodiments herein may comprise a special purpose or general-purpose computer including various computer hardware, as discussed in greater detail below.

One embodiment described herein includes functionality for modeling and simulating a complex computer system. In the embodiment described herein, to model the complex computer system an overall model exists. Within the overall model are device models. The overall model describes how the device models are interconnected or which device models belong to other device models. For example, one device model may represent a server and another device model may represent a client. The overall model includes information describing the connection between the server and the client. In another example one device model may be a hard disk drive. Another device model may be a server. The overall model may include information describing how the hard disk drive device model is incorporated into the server device model.

The overall model further includes a workload generator. The workload generator generates computing transactions that are to be performed between the device models within the overall model. For example, the workload generator may generate a retrieve mail transaction. The retrieve mail transaction may be divided up into individual actions such as individual processor activities, network activities, and disk I/O. These individual actions are simulated by the device models. As such, information can be obtained about the usage of devices being modeled and/or latencies for actions to be performed. As such, an indication of the amount of time to complete a transaction can be calculated. The workload generated by the workload generator is dependent on device models within the overall model. For example a device model for a client computer system may specify that a transaction is performed at a given rate. The workload generator will then translate that transaction to specific workload tasks to be performed by device models within the overall model.

Some embodiments described herein further include functionality for performing the simulation by using a fixed amount of memory on the computer system performing the simulation. This can be accomplished by maintaining a limited number of data points. For example, in previous systems, the systems would simulate for a selected period of time. The amount of memory used in the simulating system was dependent on the amount of time the simulation took and the various activities that took place within the simulation. Because previous systems maintained output data points for all simulation results data, memory requirements for the simulating system were typically high and expanding as more data points were generated. Some embodiments described herein minimize the memory resources usage by maintaining an average output. Specifically, one embodiment described herein includes functionality whereby the output is aggregated into an averaged output such that there is no need to maintain all output data points. Additionally, by using an averaged output, one embodiment described herein is able to detect when the output is converging to a stable and consistent output. The output may include any indication of latencies and/or device utilization outputs. When a sufficient number of latencies and/or device utilization outputs have been collected to allow the simulation output to converge to a consistent steady state or to be within a reasonable deviation from the convergence, a simulation can be terminated as further simulation will not necessarily provide additional information, but may rather simply be an unnecessary use of computing resources.

Referring now to FIG. 1, an overall model 102 is shown. The overall model includes several components including a performance scenario application programming interface (API) 104, a simulation controller 106, a workload generator 108, an event processor 110, a statistics collector 112, a device model library 114 and device models 116, 118 and 120.

The performance scenario 104 is a container that holds information regarding the system topology. For example, the performance scenario defines the hardware instances modeled by device models, hardware configuration of the device models, and the workload definition. The performance scenario may define users and their characteristics to define the workload of the system being simulated by the overall model 102.

Figure 2:
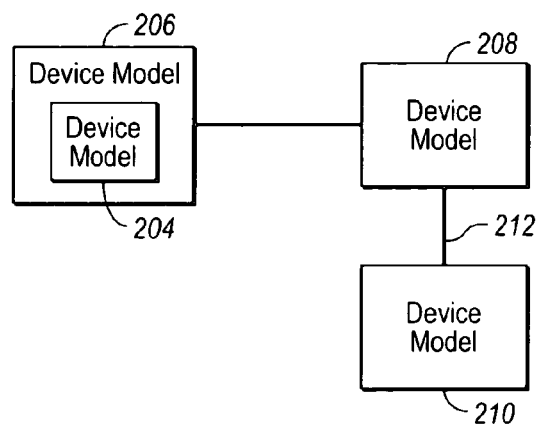
FIG. 2 illustrates interconnection of device models.

Referring now to FIG. 2, some functionality of the performance scenario API 104 is illustrated. The performance scenario API 104 may define interconnections for a model of a computing system including device models 204, 206, 208, 210. As illustrated, device models may be connected in a fashion to represent the modeled system. The performance scenario API 204 may specify device models that are interconnected with one another. For example, the performance scenario API 204 may specify servers interconnected with clients. For example, the device model 208 may represent a server model where the model 210 represents a client model. An interconnection 212 may be specified in the overall model 102 connecting the server model 208 to the client model 210. Additionally, the performance scenario API 204 may specify individual devices within a computer system. For example, the structured model 202 may specify for a computer system devices such as processors, network connections, storage, memory and so forth. Illustratively, FIG. 2 illustrates that device model 204 is specified as a component of device model 206.

The overall model 102 may be used, in one exemplary embodiment to evaluate complex computer systems to determine expected utilization of devices in the computer system and latencies for transactions performed within the computer system. This may be used to determine the stability of the complex computer system, capacity of the complex computer system, speed of the complex computer system, and the like. The overall model 102, therefore includes a workload generator 108. The workload generator 108 produces activities to be simulated by the device models. For example, if the device model 204 is a model of a hard drive, the workload generator 108 may produce disk I/O actions, such as reads and writes, that are to be performed by the device model. In one embodiment, the workload generator 108 produces transactions and activities according to transactions specified in a device model. For example, a client device model may include a parameter that indicates that the device model generates 12 get mail transactions per second. The workload generator 108 creates the actions corresponding to these transactions for processing by device models within the overall model 102.

The workload generator 108 creates transactions. The transactions may be modeled as a series of workload requests or actions. For example, in one embodiment a transaction may be defined by an edge labeled directed graph that characterizes the causality dependencies between the workload requests. Referring to FIG. 3, an example of an edge labeled directed graph 300 is illustrated. The edge labeled directed graph 300 illustrates an example of actions that may be included as part of a server request transactions. For example at 302 processor activities as part of a server request are modeled. At 304 network activities as part of a server request are modeled. The processor activities illustrated at 302 may be defined in one embodiment as a number of cpu cycles. These cpu cycles can then be directed to an appropriate one of the device models for simulation. The network activities at 304 may be defined in one embodiment as a transfer of an amount of data to be transferred over a network. In some embodiments, the network activities may be further divided into smaller network transactions where the network transactions are divided into packets of an appropriate size. The network activities can be directed at the same device model for simulation.

The direction of the graph edges in the edge labeled directed graph 300 represents the causality of actions. An action starts after all the previous actions are ended. A transaction is not always sequential. For example FIG. 3 further illustrates an edge labeled directed graph 306 with parallel segments that start with a "fork" node 308 and end with a "join" node 310. The logic of the "join" node 310 is that it is not complete until after all prior actions from the joining branches finish their processing.

Latencies can be calculated for an overall transaction by combining latencies of individual actions. When individual actions are performed in series, such as is shown at graph 304, the latencies can simply be added together to arrive at the overall transaction latency. When individual action are performed synchronously in parallel, the longest latency in the parallel action may be used. So for example in the graph 306, the overall latency is the longest of A+B+C+D+F and A+E+F.

As described previously, an action of a transaction represents an integral application operation of one of an action type. In the examples shown, an action is a modeling abstraction that covers a set of actual machine instructions or that consume a resource or a set of resources of similar types. For example, the following actions may be included within a transaction, compute operation, disk I/O, and communication. A compute action may be defined as a number of cpu operations. A disk I/O may be defined as including an operation and a size. For example, a disk I/O may specify one of a random read, a random write, a sequential read, or a sequential write and a size of the operation. A communication operation may be defined in terms of a size of a block of data to be transmitted on a network.

Each action in the transaction is generated by a particular application service and is scheduled for execution in the same resource container, i.e. the same computer, that hosts the application service. In the case of the communication action the resource assigned to execute the action is the resource responsible for network coordination. The device model associated with the principal action resource is the master device that schedules the action on other device models and computes the overall action latency.

The workload transactions generated by the workload generator 108 are dependant on the device models included within the overall model 102. For example, certain client models may be designed to request mail at a given rate. The workload generator 108 generates transactions for the client model at that rate. The workload generator 108 will generate transactions for other affected device models as well. So for example, the workload generator 108 will generate transactions for responses from the server model to which the client model requests are directed.

The event processor 110 creates, from the transactions from the workload generator, hardware events corresponding to the actions. For example a communication request from a web server to a database request will cause the event processor 110 to create a send message event sent to a web server NIC and a receive message hardware event to the receiving database server NIC. The event processor 110 calls the device models to determine how long the event will take, i.e. the latency, on the specific instance of hardware. For example a NIC device model will determine the time required to send 100 Kbytes through a fast Ethernet network. The event processor 110 also takes into account queue effects such as when events compete for a single resource, and resource sharing such as for example when multiple threads share a single CPU.

Due to the complex nature of devices being modeled by the device models and that a complex device can be modeled by several device models, an application action can be scheduled on multiple device models. The set of device models that process the same application action usually represent a compound device or a subsystem that include connected devices. For example, a RAID array may be modeled by several individual disk models interconnected together. As such, the concepts of data mirroring and data striping common in RAID examples may cause the same actions be applied to several individual disk models when an action is applied to a RAID array model.

The following is an example of a networking example. At the transport layer of the OSI model, an application sends a message over the network from computer X to computer Y. At the data link layer the message is split into packets and each packet travels through the network interface card in the computer X, the network switch and finally through the network interface in the computer Y. Then the message is assembled from the packages in the computer Y and the application in X is notified that the communication has completed and it can proceed with subsequent actions.

This example demonstrates how a single application action has been processed by three difference devices. Each of these devices can introduce a latency component to the action and the total action latency is calculated out of the detailed device latencies by the device model that has been assigned to be the master device for this action.

Activities from a workload generator 108 can be directed to a device model for simulation. The device models library is a container including the device models, such as for example device models 116, 118, and 120. The device models define how device will act during simulation. The device models may define latency information for a given action simulated by the device model. For example, a model of a disk drive may include eight parameters including a constant and slope for random reads, a constant and slope for random writes, a constant and slope for sequential reads, and a constant and slope for sequential writes. Latencies for disk drives are generally linear depending on the size and type of the I/O operation. By specifying a size and type of I/O operation, e.g. random read of 100 KB, a latency can be calculated from the constant and slope. Similarly, other device models may include defined latencies. For example, CPU device models may specify latencies for a given number of processor operations or for a given number of processor cycles consumed. Network interface device models may specify latencies for sending or receiving a given amount of data.

The device model may include additional mapping for further distributing activities from the workload generator. An example is illustrated in FIG. 4. FIG. 4 illustrates a device model 402 representing a DeviceX. The device model 402 may be for example a model of a client computer system. The device model 402 is shown as being interconnected to a number of other device models 404, 406, and 408. In the example shown, the device models 404, 406, and 408 may be models of storage devices. For example, the device models 404, 406, and 408 may be models of SANs, multi disk arrays, individual hard drives, and the like.

Notably, while not shown explicitly, when a model is for a higher level component, the device model may include lower level device model components as part of the model. For example, a multi disk array component model may include single disk drives as part of the component model. The following is an example of a single disk configuration:

```
<DeviceConfiguration
Type="Microsoft.CapacityManager.Modeling.DeviceModels.DiskSimulationModel">
    <!--
        Manufacturer: Hewlett-Packard
        Model: BF036863B9
    -->
    <Property Name="Guid" Value="09AD9CB0-BBD5-4204-8ABF-894A103A83D7"/>
    <Property Name="Name" Value="SCSI 320, 15K RPM, 36 GB" />
    <Property Name="StorageSize" Value="36400000000" />
    <Property Name="InterfaceType" Value="SCSI" />
    <Property Name="SeekTime" Value="0.0038" />
    <Property Name="RotationalSpeed" Value="250" />
    <Property Name="ExternalTransferRate" Value="320000000" />
    <Property Name="InternalTransferRate" Value="762000000" />
    <Property Name="ControllerCacheSize" Value="8388608" />
    <Property Name="RandomReadLatencyConstant" Value="4.062E-03" />
    <Property Name="RandomReadLatencySlope" Value="2.618E-08" />
    <Property Name="RandomWriteLatencyConstant" Value="4.596E-03" />
    <Property Name="RandomWriteLatencySlope" Value="1.531E-08" />
    <Property Name="SequentialReadLatencyConstant" Value="1.328E-04" />
    <Property Name="SequentialReadLatencySlope" Value="9.453E-09" />
    <Property Name="SequentialWriteLatencyConstant" Value="2.531E-03" />
    <Property Name="SequentialWriteLatencySlope" Value="1.521E-08" />
</DeviceConfiguration>
```

In the example above, several parameters are specified including the type of device, the storage size, the interface type, the seek time, the rotational speed, the external transfer rate, the internal transfer rate, the controller cache size, and the various constants and slopes described previously.

A composite storage device can be modeled by using a hierarchical data structure including a number of instances of definitions of parameters for a component of the composite storage device instantiated together. For example, a disk group model may include disk models. Illustratively, the following is an XML document that illustrates one example of the single disk configuration described above being implemented in a disk group configuration:

```
<DeviceConfiguration
Type="Microsoft.CapacityManager.Modeling.DeviceModels.DiskGroupSimulationMo
del">
    <Property Name="Guid" Value="884ECD92-9690-4253-908A-A1E6640E7EDB"/>
    <Property Name="Name" Value="4-disk 15K RPM RAID-10" />
    <Property Name="RAIDLevel" Value="10" />
    <Property Name="StripeUnitSize" Value="65536" />
    <InnerConfigurations>
        <InnerConfiguration Configuration="09AD9CB0-BBD5-4204-8ABF-894A103A83D7"/>
        <InnerConfiguration Configuration="09AD9CB0-BBD5-4204-8ABF-894A103A83D7"/>
        <InnerConfiguration Configuration="09AD9CB0-BBD5-4204-8ABF-894A103A83D7"/>
        <InnerConfiguration Configuration="09AD9CB0-BBD5-4204-8ABF-894A103A83D7"/>
    </InnerConfigurations>
</DeviceConfiguration>
```

In this example of a disk group configuration, the disk group model includes four instances of the single disk configuration described previously. Illustratively, the references to <InnerConfiguration Configuration="09AD9CB0-BBD5-4204-8ABF-894A103A83D7"/> include the single disk configuration by reference.

Returning once again to the example of FIG. 4, a generic mechanism is used to represent associations between devices. The associations can represent physical connections between the devices, such as network connections, or a logical association through software configuration, such as file mapping to disks. The associations can be queried by the device models to select the right subset of devices for the application actions depending on the action parameterization. The generic mechanism for device associations, in the example shown in FIG. 4, is implemented using scheduling keys 410, 412, 414 and 416.

Each scheduling key represents that the device belongs to a scheduling subset of another device. For example, the device model 402 includes a scheduling subset 418. The scheduling subset includes actions and subservices. For example, the scheduling subset 418 illustrates Disk I/Os as action types. Two subservices are called out, namely Data and Log subservices for disk I/O, but other subservices are possible such as a subservice which models processor affinity by mapping compute actions to specific processors in a CPU configuration. Data Disk I/Os may be disk reads and writes of data to a database or other data storage container. Log Disk I/Os may be disk reads and writes of data to a log container. The scheduling subset 418 maintains a correlation to device models for each unique value of a scheduling key so it can identify device models with an appropriate key when necessary, and, select a single device using any supported scheduling policy. A scheduling key, in the embodiment shown, is a tag attached to a device model that indicates that the device can perform a certain function. Other device models, such as the device model 402, can maintain lists of tags that they are interested in and the sets of device models that are marked with these tags.

As shown in FIG. 4, device models 404, 406, and 408 are tagged with scheduling keys 410-416. Device models 404 and 406 are tagged with keys 410 and 412 respectively with two key elements, namely ActionType=DiskI/O and SubService=Data. This means that both these device models can process disk I/O actions that are targeted to the "Data" Subservice The device models 406 and 408 are tagged with the keys 414 and 416 respectively with two key elements, namely ActionType=DiskI/O; SubService=Log. This means that both these device models can process disk I/O actions that are targeted to the "Log" Subservice. Note that the device model 406 is tagged with both keys simultaneously. This represents the fact that the disk drive that corresponds to the device model 406 contains both file types and the application being modeled by the overall model 102 is using this drive to store data and log information.

The device model 402, in this example, is a master device that maintains the scheduling subset 418 including the list of scheduling keys and devices associated with them. If the device model 402 is presented with an application action of the type "DiskI/O" that has the subservice attribute of "Log", the device model 402 may query the scheduling subset 418 for the scheduling key ActionType=DiskI/O; Subservice=Log. The query would return a subset of devices including device models 406 and 408. The device model 402 can then use a scheduling policy to select a single device to continue processing the action. The scheduling policy may be for example, random, priority random, least busy or random, round robin, and the like. Random scheduling is performed by randomly choosing a device model where each device model has identical probability of being selected. Priority random scheduling is performed by choosing a device model at random, but where each device model has a priority that determines the probability for this device model being selected. In one embodiment, the priority may depend on the device state. Least busy or random scheduling is performed by selecting the device with the least busy index. If more than one device has the same least busy index, then a random policy is applied to those devices. Round robin scheduling is applied by organizing a list of device models in a closed loop and selecting a device model by selecting the next device model relative to a previously selected device.

While the preceding example has illustrated a disk I/O example, similar actions may be performed for processor activities or network activities. For example, a similar scheme can be used for modeling combinations of network devices. A principle device model that represents the network coordination resource such as a LAN switch, can send an action from the workload generator to sending and receiving computer models. The sending computer model finds a network interface card (NIC) model that is connected to the LAN switch that processes the action. Each NIC model has a scheduling key that indicates to what computer device model the NIC model correspond. The computer device model constructs the scheduling key for the NIC model and retrieves the NIC model for processing the action.

The structure of the scheduling keys can be different and depends on the nature of the association between devices. If a device is selected for the action based on its connectivity then the connectivity information may be part of the scheduling key. In one embodiment, two types of scheduling keys are used, namely subservice keys and communication keys. A subservice key contains two parameters as illustrated above, action type and subservice. The action type identifiers an action type such as for example, processor activities, network communication activities, or disk I/O activities. The subservice argument identifies a particular type of action type. Any appropriate number of subservices may be define.

A communication key includes an action type, a communication peer, and a direction. For example, a communication key may specify a network communication, to/from a specific device model, where the communication is a send or receive. The communication keys may be used, for example, to identify WAN links for a WAN cloud device model. In this case the WAN cloud model schedules the action on a WAN link that is selected based on the direction that this WAN link is configured to model and the computer that the link connects to the cloud. Using these two parameters the WAN cloud model constructs an instance of the communication scheduling key and selects a WAN link for the action.

The scheduling key mechanism may be used, for example, for network modeling, such as LAN connected computers via one or more NIC's and WAN links via NICs. The scheduling key mechanism may also be used, for example to model RAID storage and/or SAN storage.

Returning once again to FIG. 1, the simulation controller 106 may be embodied as set of APIs that control the start, end, and: cancellation of the simulation process. The statistics collector 112 uses the, raw data produced by the event processor 110, filters the data relevant to the users, and keeps statistics such as the overall utilization of devices and the latency of end to end transactions.

Figure 5:
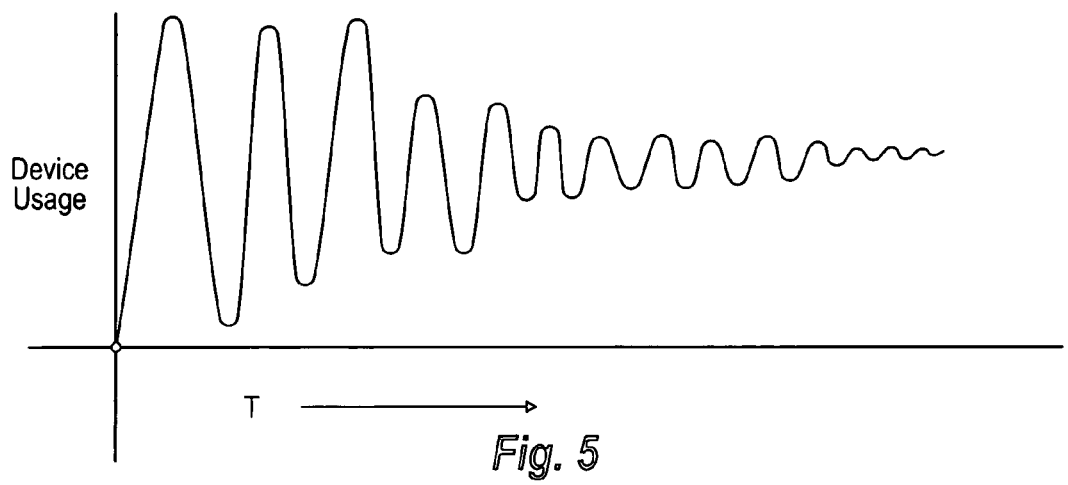
FIG. 5 illustrates the dynamic of the device utilization average.

In one embodiment, device utilization and latencies statistics can be kept by keeping an averaged value of the device utilizations and latencies. For example, FIG. 5 illustrates a typical average device utilization over time graph. Notably, at times near the beginning of simulation, the average device utilization varies widely, while as time progresses, the device usage varies less.

Some embodiments are able to maintain a fixed memory footprint for the system used to simulate the overall model 102 by maintaining a limited number of the data points generated: by a device model and an averaged value for device utilization and/or device latency. For example, rather than maintaining output values for all values for the graph shown in FIG. 5, a current averaged value along with one or more statistical measurements can be maintained. The averaged value will approach an asymptotic value, which is the average device utilization and/or latency when the simulation of the particular device or transaction is at a stabilized equilibrium.

The duration of the simulation is a function of the statistical variations of the results from the model. For example, the statistic collector 112 can maintain statistics including device utilizations and latencies in the system. The simulation controller 106 can detect when certain statistical characteristics of the averaged device utilizations and/or latencies are within given ranges and can thus end the simulation.

Device utilization and/or latencies can be monitored for a number of devices and/or transactions. When enough (in some cases all) of the device utilizations and/or latencies have stabilized to within a specified deviation, the simulation can be ended.

Notably, various averaging techniques can be used. For example, a true average may be calculated. Alternatively, a current averaged value may be normalized with a previous averaged value. Additionally, there are several techniques that may be used to calculate variances and standard deviation.

Figure 6:
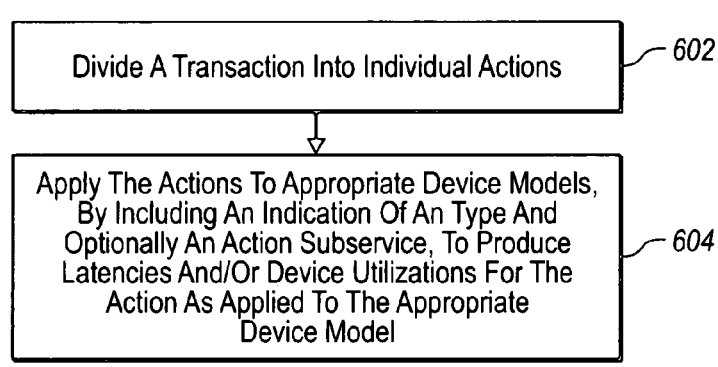
FIG. 6 illustrates a method of simulating devices.

Referring now to FIG. 6, a method of simulating device interactions in performing an overall transaction is illustrated. The method may be practiced, for example, in a computing system for simulating interconnected devices. The method of simulating device interactions in performing an overall transaction may be performed to obtain an output of system performance characteristics including measurement of latencies and/or device loads for actions performed by devices in performing the overall transaction. The method includes dividing a transaction into individual actions (act 602). The method further includes applying the actions to appropriate device models to produce latencies and/or device utilizations for the action as applied to the appropriate device model. (act 604). This may be done by including an indication of an action type and optionally an action subservice.

The method may further include obtaining a transaction latency and/or device utilizations by combining the latencies and/or device utilizations for the actions. Combining the latencies and/or device utilizations for the actions may include adding latencies together for actions that are performed serially. Alternatively, combining the latencies and/or device utilizations for the actions may include including a longest latency of two or more latencies when the two or more latencies are performed in parallel. Notably parallel and serial combinations may be done together as well.

The method may further include storing one or more averaged transaction latencies and/or device utilizations over time for one or more transactions. One or more current averaged transaction latencies and/or device utilizations are aggregated into the one or more stored averaged transaction latencies and/or device utilizations. If the one or more statistical characteristics of the averaged transaction latencies and/or device utilizations are within a predetermined range that specifies the desired output accuracy, the simulation may be ended.

Additionally a fixed memory footprint can be maintained when simulating device interactions by only maintaining a fixed number of stored averaged transaction latencies and/or device utilizations and a fixed number of current averaged transaction latencies and/or device utilizations.

Figure 7:
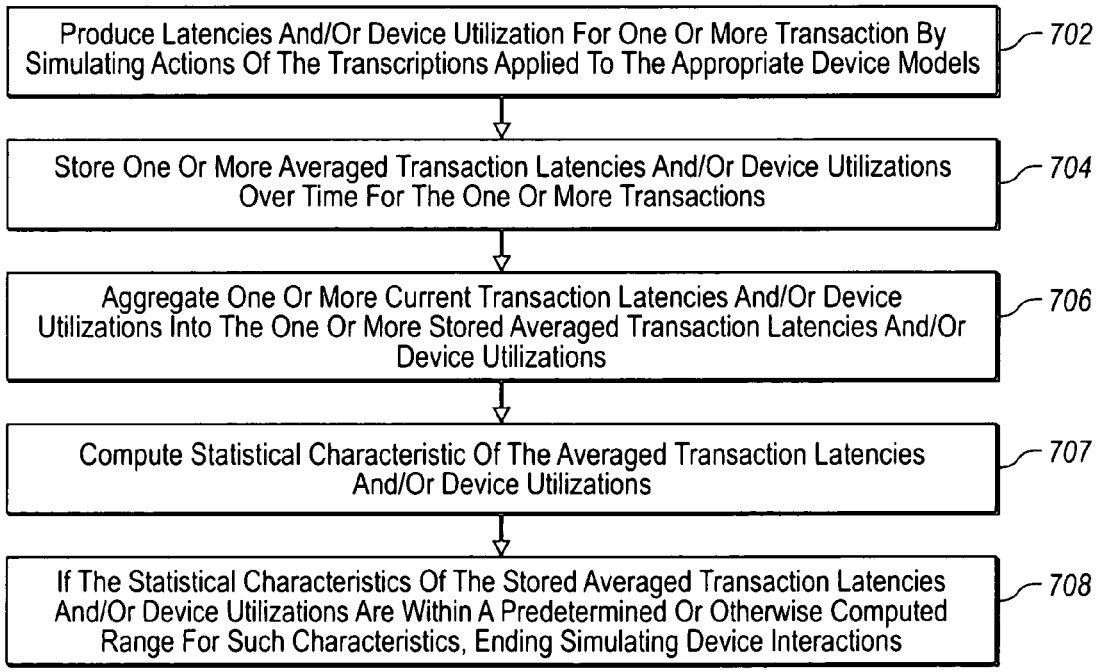
FIG. 7 illustrates another method of simulating devices.

FIG. 7 illustrates another method of simulating device interactions. The method may be performed in a computing system for simulating interconnected devices. Simulating device interactions may be performed to obtain an output of system performance characteristics including measurement of latencies and/or device loads for actions performed by devices in performing the overall transaction. The method includes producing latencies and/or device utilizations for one or more transaction by simulating actions of the transactions applied to the appropriate device models (act 702). As described previously, this may be accomplished in one embodiment by using the workload generator 108 of FIG. 1 to apply workload actions to the device models in the device library 11.

The method further includes storing one or more averaged transaction latencies and/or device utilizations over time for the one or more transactions (act 704). For example, the statistics collector 112 of FIG. 1 may be used to store latencies and/or device utilizations obtained from the simulation of the device models in the device models library 114.

The method further includes aggregating one or more current averaged transaction latencies and/or device utilizations into the one or more stored averaged transaction latencies and/or device utilizations (act 706).

The method also includes computing statistical characteristics of the averaged transaction latencies and/or device utilizations (act 707). For example;, computations may be made to calculate the how much averaged transaction latencies and/or device utilizations have changed.

If the computed statistical characteristics of the average transaction latencies and/or device utilizations are within a predetermined or otherwise computed range, simulating device interactions is ended (act 708). The simulation controller 106 of FIG. 1 can monitor the convergence of averaged transaction latencies and/or device utilizations and can stop the simulation as appropriate.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system for simulating interconnected devices, a method of simulating device interactions in performing an overall transaction to obtain an output of system performance characteristics including measurement of at least one of latencies or device utilizations for actions performed by devices in performing the overall transaction, the method comprising:

dividing a transaction into individual actions comprising subparts of the transaction;

applying the individual actions to appropriate device models, by including an indication of an action type for each individual action, to produce at least one of latencies or device utilizations for the action as applied to the appropriate device model;

storing at least one averaged transaction latency or device utilization over time for one or more transactions; and aggregating one or more current transaction latencies or device utilizations into the one or more stored averaged transaction latencies or device utilizations.

2. The method of claim 1 further comprising, obtaining at least one of a transaction latency or device utilizations by combining the latencies or device utilizations for the actions.

3. The method of claim 1, wherein applying the individual actions to the appropriate device models further includes an indication of an action subservice.

4. The method of claim 3, wherein one or more device models are hierarchical comprising sub-device models within the device model, the device model further comprising an indication of sub-device models assigned to actions based on the action type and subservice, the method further comprising at the device model assigning an action to a sub-device model by referencing the action type and subservice for an action.

5. The method of claim 4, wherein a plurality of sub-device models are assigned to a particular action based on the action type and subservice, wherein assigning an action to a sub-device model by referencing the action type and subservice for an action comprises assigning a sub-device model based on at least one of a round-robin assignment, a random assignment, a prioritized random assignment, or a least busy assignment.

6. The method of claim 1, wherein aggregating the at least one latency or device utilizations for the actions comprises adding latencies together for actions that are preformed serially.

7. The method of claim 1, wherein aggregating the at least one latency or device utilization for the actions comprises including a longest latency of two or more latencies when the two or more latencies are performed in parallel.

8. The method of claim 1, further comprising maintaining a fixed memory footprint when simulating device interactions by only maintaining at least one of a fixed number of stored averaged transaction latencies or device utilizations and at least one of a fixed number of current transaction latencies or device utilizations.

9. The method of claim 1, further comprising storing one or more averaged latencies or device utilizations for the actions.

10. The method of claim 1 further comprising:
if the stored averaged transaction latencies or device utilizations have statistical characteristics that are within a predetermined or otherwise computed range for such statistical characteristics, ending simulating the device interactions.

11. In a computing system for simulating interconnected devices, a computer readable storage medium including data structures for defining devices useful for simulating device interactions in performing an overall transaction to obtain an output of system performance characteristics including measurement of at least one latency or device utilizations for actions performed by devices in performing the overall transaction, the computer readable storage medium comprising:
a first field defining an action type for an action;
optionally a second field related to the first field defining a subservice defining a particular class of the action type;
one or more device model fields defining device models comprising methods for computing at least one the latencies or device utilizations for actions simulated by the device models; and
a third field comprising a scheduling key correlating a device model to an action type and optionally a subservice; and
computer-executable instructions for implementing a method comprising:
dividing a transaction into individual actions comprising subparts of the transaction;
applying the individual actions to appropriate device models, by including an indication of an action type for each individual action, to produce at least one of latencies or device utilizations for the action as applied to the appropriate device model;
storing at least one averaged transaction latency or device utilization over time for one or more transactions; and
aggregating one or more current transaction latencies or device utilizations into the one or more stored averaged transaction latencies or device utilizations.

12. The computer readable storage medium of claim 11, wherein the first and second field are defined within a master device model field defining a master device, the master device model field further comprises a scheduling policy for selecting other device model fields to apply an action to when multiple fields specify scheduling keys correlating different device models to the same action type and optionally subservice.

13. The computer readable storage medium of claim 12, wherein the scheduling policy is one or more of random, priority random, least busy or random, or round robin.

14. The computer readable storage medium of claim 11, wherein the scheduling key comprises a subservice key including action type and subservice parameters.

15. The computer readable storage medium of claim 11, wherein the scheduling key comprises a communication key including action type, communication peer, and communication direction.

16. The computer readable storage medium of claim 11, wherein the one or more device model fields defining device models that define methods for computing latencies for one or more of disk I/O operations, processor activities, or network transmissions.

17. The computer readable storage medium of claim 11, wherein one or more of the device model fields defining device models includes lower level device model components.

18. The computer readable storage medium of claim 11, wherein the computer-executable instructions for implementing a method further comprising:
if the stored averaged transaction latencies or device utilizations have statistical characteristics that are within a predetermined or otherwise computed range for such statistical characteristics, ending simulating the device interactions.

* * * * *